United States Patent
Oh et al.

(10) Patent No.: US 11,498,245 B2
(45) Date of Patent: Nov. 15, 2022

(54) DIP-MOLDED ARTICLE, LATEX COMPOSITION FOR DIP-MOLDING AND PREPARATION METHOD THEREOF

(71) Applicant: LG Chem, Ltd., Seoul (KR)

(72) Inventors: Seung Whan Oh, Daejeon (KR); Won Sang Kwon, Daejeon (KR); Yong Seok Jung, Daejeon (KR); Jung Eun Kim, Daejeon (KR); Sang Jin Shin, Daejeon (KR)

(73) Assignee: LG Chem, Ltd.

( * ) Notice: Subject to any disclaimer, the term of this patent is extended or adjusted under 35 U.S.C. 154(b) by 300 days.

(21) Appl. No.: 16/644,634

(22) PCT Filed: Dec. 4, 2018

(86) PCT No.: PCT/KR2018/015273
§ 371 (c)(1),
(2) Date: Mar. 5, 2020

(87) PCT Pub. No.: WO2019/112306
PCT Pub. Date: Jun. 13, 2019

(65) Prior Publication Data
US 2021/0039286 A1 Feb. 11, 2021

(30) Foreign Application Priority Data
Dec. 8, 2017 (KR) .................. 10-2017-0167948

(51) Int. Cl.
*B29C 41/14* (2006.01)
*B29C 41/00* (2006.01)
*C08J 5/02* (2006.01)
*C08J 7/18* (2006.01)
*C08L 9/04* (2006.01)
*C08L 13/02* (2006.01)

(52) U.S. Cl.
CPC ........... *B29C 41/14* (2013.01); *B29C 41/003* (2013.01); *C08J 5/02* (2013.01); *C08J 7/18* (2013.01); *C08L 9/04* (2013.01); *C08L 13/02* (2013.01); *C08J 2309/04* (2013.01); *C08J 2313/02* (2013.01); *C08J 2449/00* (2013.01)

(58) Field of Classification Search
CPC .......... B29C 41/14; B29C 41/003; C08J 5/02; C08J 7/18; C08J 2449/00; C08J 2309/04; C08J 2313/02; C08L 9/04; C08L 13/02
USPC ....................................................... 264/306
See application file for complete search history.

(56) References Cited

U.S. PATENT DOCUMENTS

| 3,501,302 A | 3/1970 | Foltz | |
|---|---|---|---|
| 2002/0081375 A1 | 6/2002 | Massey et al. | |
| 2003/0021903 A1* | 1/2003 | Shlenker | A01N 25/10 427/407.1 |
| 2005/0037498 A1 | 2/2005 | Ribi | |
| 2006/0041057 A1 | 2/2006 | Koecher et al. | |
| 2011/0287553 A1 | 11/2011 | Hassan et al. | |
| 2014/0259332 A1* | 9/2014 | Hassan | G01N 21/94 2/457 |
| 2015/0232637 A1* | 8/2015 | Cha | C08K 3/346 524/447 |
| 2015/0362435 A1 | 12/2015 | Hassan et al. | |
| 2016/0040061 A1 | 2/2016 | Krowne et al. | |
| 2018/0282543 A1 | 10/2018 | Kim et al. | |

FOREIGN PATENT DOCUMENTS

| CN | 105452362 A | 3/2016 |
|---|---|---|
| JP | 2008510851 A | 4/2008 |
| JP | 2010133032 A | 6/2010 |
| JP | 2016532743 A | 10/2016 |
| KR | 100781599 B1 * | 12/2007 |
| KR | 100781599 B1 | 12/2007 |
| KR | 20110038306 A | 4/2011 |
| KR | 20120081762 A | 7/2012 |
| KR | 20130076079 A | 7/2013 |
| KR | 20150025637 A | 3/2015 |
| KR | 20160061143 A | 5/2016 |
| KR | 20170051223 A | 5/2017 |
| KR | 101779295 B1 | 9/2017 |
| WO | 0060395 A1 | 10/2000 |
| WO | 03037391 A1 | 5/2003 |
| WO | 2008107937 A1 | 9/2008 |

OTHER PUBLICATIONS

Translation of KR 100781599, Dec. 5, 2007. (Year: 2007).*
International Search Report for PCT/KR2018/015273 dated Mar. 12, 2019.
European Search Report for Application No. 18885155.4, dated Nov. 30, 2020, 12 pages.

* cited by examiner

*Primary Examiner* — Hui H Chin
(74) *Attorney, Agent, or Firm* — Lerner, David, Littenberg, Krumholz & Mentlik, LLP

(57) ABSTRACT

Provided is a dip-molded article, and more particularly, provided are a dip-molded article including: a layer derived from a latex composition for dip-molding; and a layer derived from a polymer including a repeating unit derived from a diacetylene-based compound, a latex composition for dip-molding, and a preparation method thereof.

10 Claims, 6 Drawing Sheets

DIP-MOLDED ARTICLE, LATEX COMPOSITION FOR DIP-MOLDING AND PREPARATION METHOD THEREOF

CROSS-REFERENCE TO RELATED APPLICATION(S)

This application is a national phase entry under 35 U.S.C. § 371 of International Application No. PCT/KR2018/015273, filed Dec. 4, 2018, which claims priority to Korean Patent Application No. 10-2017-0167948, filed Dec. 8, 2017, the disclosures of which are incorporated herein by reference.

TECHNICAL FIELD

The present invention relates to a dip-molded article, and more particularly, to a dip-molded article, and a preparation method thereof.

BACKGROUND ART

Rubber gloves are used in a wide range of fields such as housework, the food industry, the electronic industry, and the medical field, and the like. Rubber gloves made by dip-molding natural rubber latex have been widely used. However, there are problems since proteins contained in natural rubber cause allergic reactions such as pain, rashes, and the like, to some users. Thus, recently, carboxylic acid-modified nitrile-based gloves, which do not cause allergic reactions, are in the spotlight in the disposable glove market. The carboxylic acid-modified nitrile-based glove is generally prepared by blending sulfur and a vulcanization accelerator in a carboxylic acid-modified nitrile-based copolymer latex to prepare a latex composition, followed by dip-molding.

However, zinc oxide used for cross-linking the carboxylic acid-modified nitrile-based copolymer latex together with the sulfur and the vulcanization accelerator forms an ionic bond with a carboxylic acid functional group of the carboxylic acid-modified nitrile-based copolymer latex to enhance strength of the glove. When the glove is exposed to an organic solvent, or the like, for a long period of time, due to characteristics of ionic bonding, the glove may swell in the organic solvent and the bonding may be weakened, and therefore the organic solvent permeates into the glove, thus causing in a situation in which the user's skin is directly exposed to organic solvent even though the user wears the gloves.

DISCLOSURE

Technical Problem

An object of the present invention is to provide a dip-molded article capable of allowing the user to visually confirm the presence or absence of defects in a dip-molded article by recognizing a change in the use environment when using the dip-molded article.

That is, an object of the present invention is to provide a dip-molded article including a separate fluorescent layer capable of allowing the user to visually confirm the presence or absence of defects in a dip-molded article by recognizing a change in the use environment on the dip-molded article, and a preparation method thereof.

Technical Solution

In one general aspect, a dip-molded article includes: a layer derived from a latex composition for dip-molding; and a layer derived from a polymer including a repeating unit derived from a diacetylene-based compound.

In another general aspect, a latex composition for dip-molding includes: at least one copolymer selected from the group consisting of a nitrile-based copolymer and a carboxylic acid-modified nitrile-based copolymer; and a diacetylene-based compound.

In still another general aspect, a preparation method of a dip-molded article includes: attaching a coagulant to a dip-molding frame (S100); immersing the dip-molding frame having the coagulant attached thereto in a latex composition for dip-molding to form a layer derived from a latex composition for dip-molding (S200); and forming a layer derived from a polymer including a repeating unit derived from a diacetylene-based compound (S300).

Advantageous Effects

When a dip-molded article is prepared according to the present invention, the prepared dip-molded article includes a separate fluorescent layer capable of allowing the user to visually confirm the presence or absence of defects of the dip-molded article, such as internal penetration or the like, of organic solvents, acids, bases, and the like, by recognizing a change in the use environment according to exposure to the organic solvents, the acids, the bases, and the like, of the dip-molded article, thus securing the use safety of the user.

BEST MODE

Figure 1:
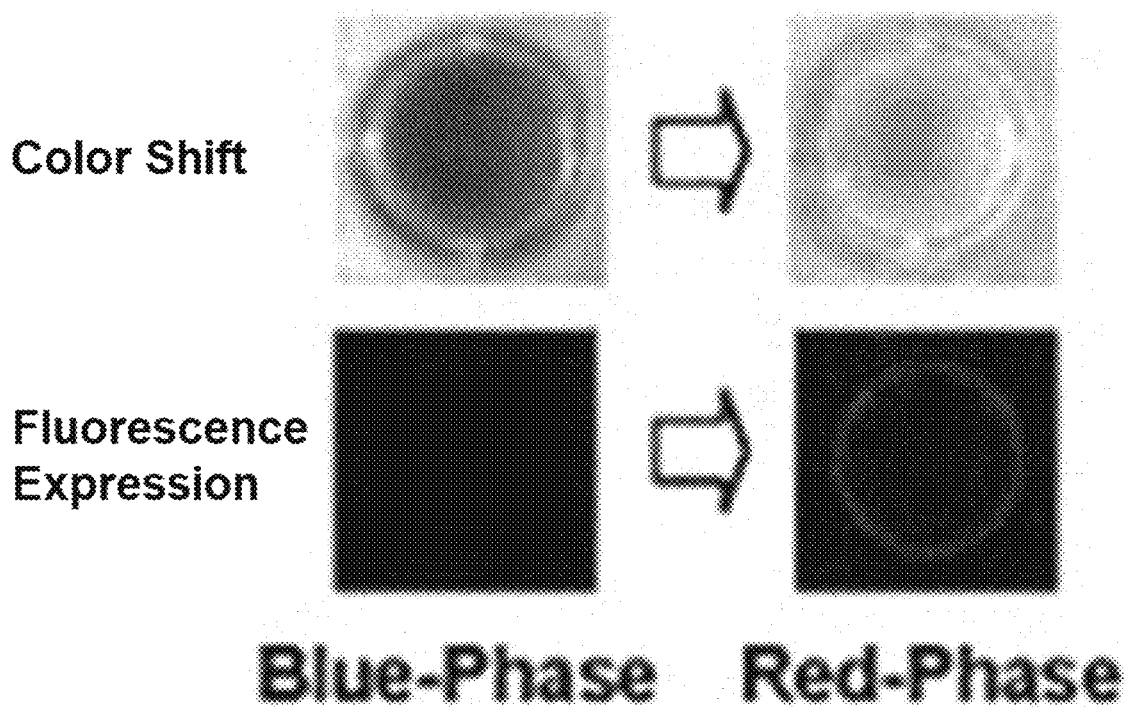
FIG. 1 is an image showing a color shift and fluorescence expression of polydiacetylene from blue to red.

Terms and words used in the present specification and claims are not to be construed as a general or dictionary meaning but are to be construed as concepts meaning and meeting the technical ideas of the present invention based on a principle that the inventors can appropriately define the concepts of terms in order to describe their own inventions in the best mode.

Hereinafter, the present invention will be described in more detail to assist in understanding of the present invention.

The terms "compound-derived repeating unit" and "monomer-derived repeating unit" used herein may refer to a component, structure, or a material itself resulting from a compound or a monomer, and specifically, may refer to a repeating unit formed in a polymer when compounds or monomers to be added participate in a polymerization reaction to form the polymer.

The term "layer derived" used herein may refer to a layer formed from a polymer or a copolymer. As a specific example, the layer derived may mean a layer formed from a polymer or a copolymer by attaching, fixing, and/or polymerizing the polymer or the copolymer on a dip-molded frame at the time of preparing a dip-molded article.

The term "cross-linking agent-derived cross-linking part" used herein may be a component, structure or a material itself resulting from a compound, and may be a cross-linking part performing a cross-linking function in a polymer or between polymers formed by an action and reaction of a cross-linking agent.

The term "latex" used herein may mean that a polymer or a copolymer polymerized by polymerization is present in a form dispersed in water. Specifically, the term "latex" may mean that fine particles of a rubber-like polymer or fine particles of a rubber-like copolymer polymerized by emulsion polymerization are present in a colloidal state in which the fine particles are dispersed in water.

The term "monovalent hydrocarbon group" used herein may refer to a monovalent atomic group formed by combining carbon and hydrogen of a monovalent alkyl group, alkenyl group, alkynyl group, cycloalkyl group, cycloalkyl group including one or more unsaturated bonds, aryl group, or the like, wherein the term "monovalent" may mean that the number of bonds in which a monovalent hydrocarbon group as a substituent is bonded to a parent, and the minimum number of carbon atoms in the substituent represented by the monovalent hydrocarbon may be determined depending on the kind of each substituent.

The term "monovalent hydrocarbon group including at least one kind of one or more hetero atoms" used herein may mean a monovalent atomic group formed by including at least one kind of one or more hetero atoms such as N, O and S, and the like, of a monovalent heteroalkyl group, heteroalkenyl group, heteroalkynyl group, heterocycloalkyl group, heterocycloalkyl group including one or more unsaturated bonds, and heteroaryl group, and the like, wherein the monovalent may mean the number of bonds in which a monovalent hydrocarbon group as a substituent is bonded to a parent, the minimum number of carbon atoms in the substituent may be determined depending on the kind of each substituent, and the limited carbon number range may be the number of carbons except for the number of hetero atoms.

The term "divalent hydrocarbon group" used herein may refer to a divalent atomic group formed by combining carbon and hydrogen such as a divalent alkylene group, alkenylene group, alkynylene group, cycloalkylene group, or cycloalkylene group including one or more unsaturated bonds, an arylene group, or the like, wherein the term "divalent" may mean the number of bonds in which a divalent hydrocarbon group as a substituent is bonded to a parent, and the minimum number of carbon atoms of the substituent represented by the divalent hydrocarbon may be determined depending on the kind of each substituent.

The term "divalent hydrocarbon group including at least one kind of one or more hetero atoms" used herein may mean a divalent atomic group formed by including at least one kind of one or more hetero atoms such as N, O and S, and the like, of a divalent heteroalkylene group, heteroalkenylene group, heteroalkynylene group, heterocycloalkylene group, heterocycloalkylene group including one or more unsaturated bonds, and heteroarylene group, and the like, wherein the term "divalent" may mean the number of bonds in which a divalent hydrocarbon group as a substituent is bonded to a parent, the minimum number of carbon atoms in the substituent may be determined depending on the kind of each substituent, and the limited carbon number range may be the number of carbons except for the number of hetero atoms.

The dip-molded article according to the present invention may include: a layer derived from a latex composition for dip-molding; and a layer derived from a polymer including a repeating unit derived from a diacetylene-based compound.

Figure 2:
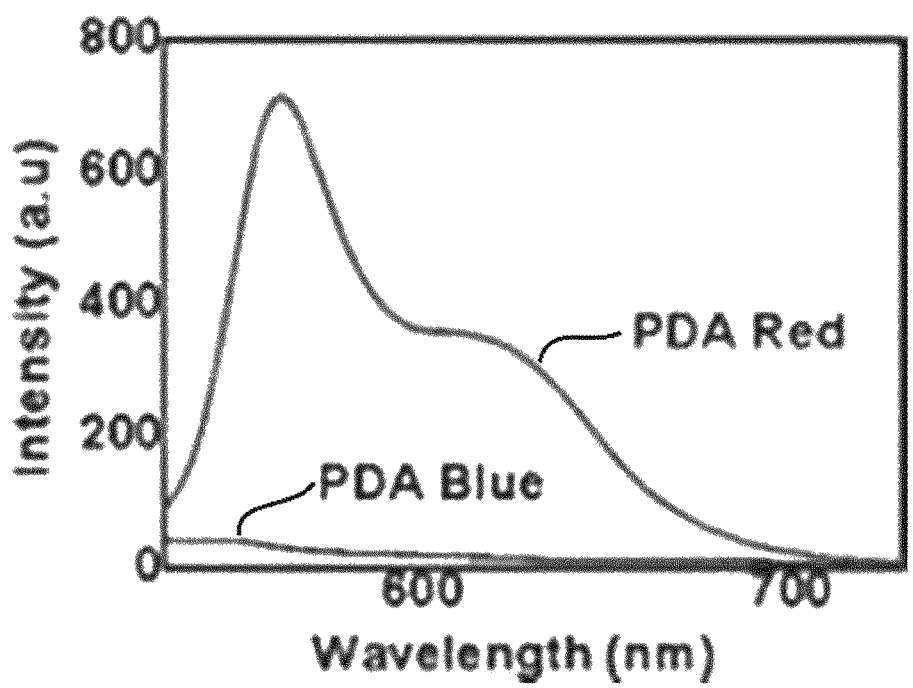
FIG. 2 is a graph showing measurement of blue and red fluorescence of polydiacetylene.
Figure 3:
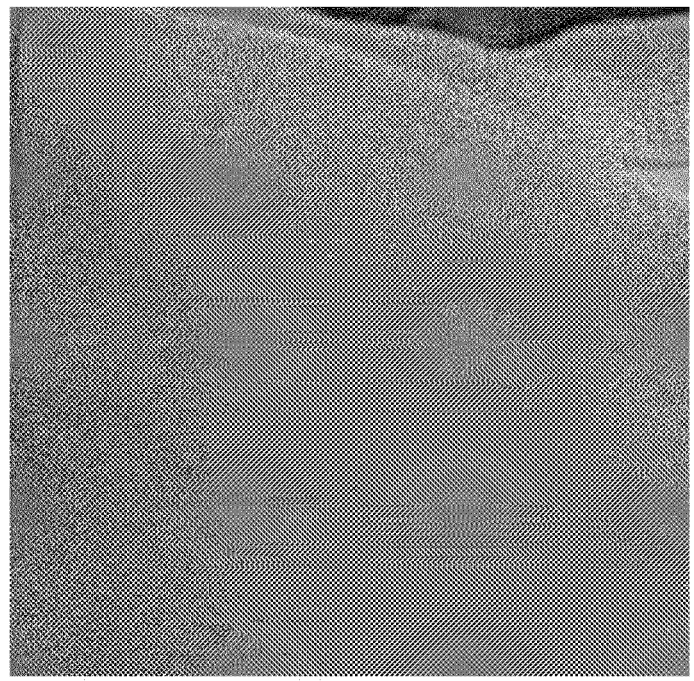
FIG. 3 is an optical image of a dip-molded article according to Example 1.
Figure 4:
FIG. 4 is an optical image of a dip-molded article including a blue polydiacetylene-derived layer according to Example 1.
Figure 5:
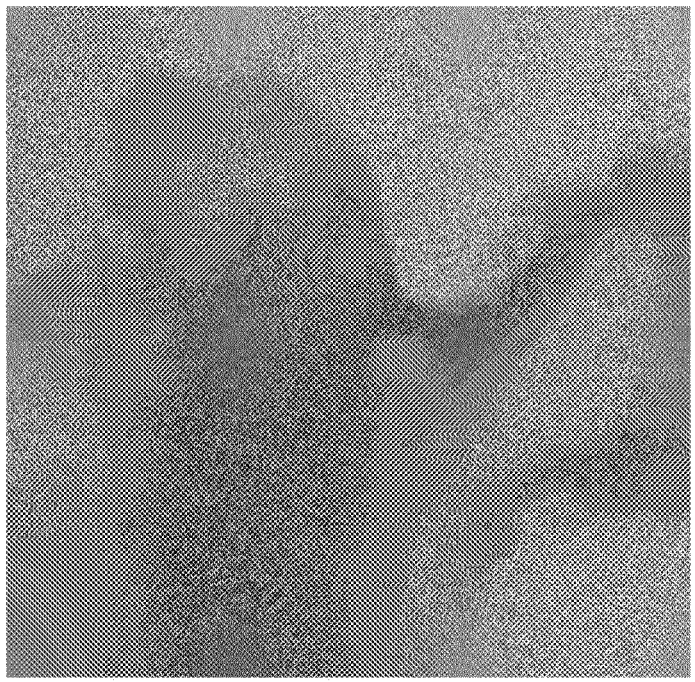
FIG. 5 is an optical image of a dip-molded article including a polydiacetylene-derived layer which is color-shifted to red due to exposure to tetrahydrofuran (THF) according to Example 1.
Figure 6:
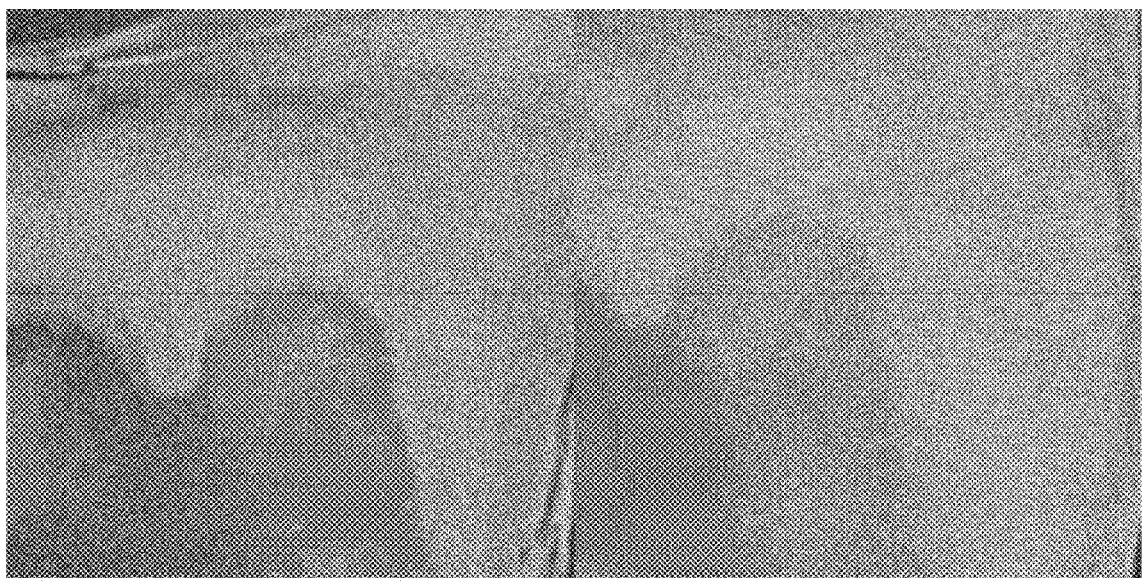
FIG. 6 is an optical image of a dip-molded article including a polydiacetylene-derived layer which is color-shifted from blue to red due to exposure to toluene according to Example 1.
Figure 7:
FIG. 7 is an optical image of a dip-molded article including a polydiacetylene-derived layer which is color-shifted from blue to red due to exposure to methanol according to Example 2.
Figure 8:
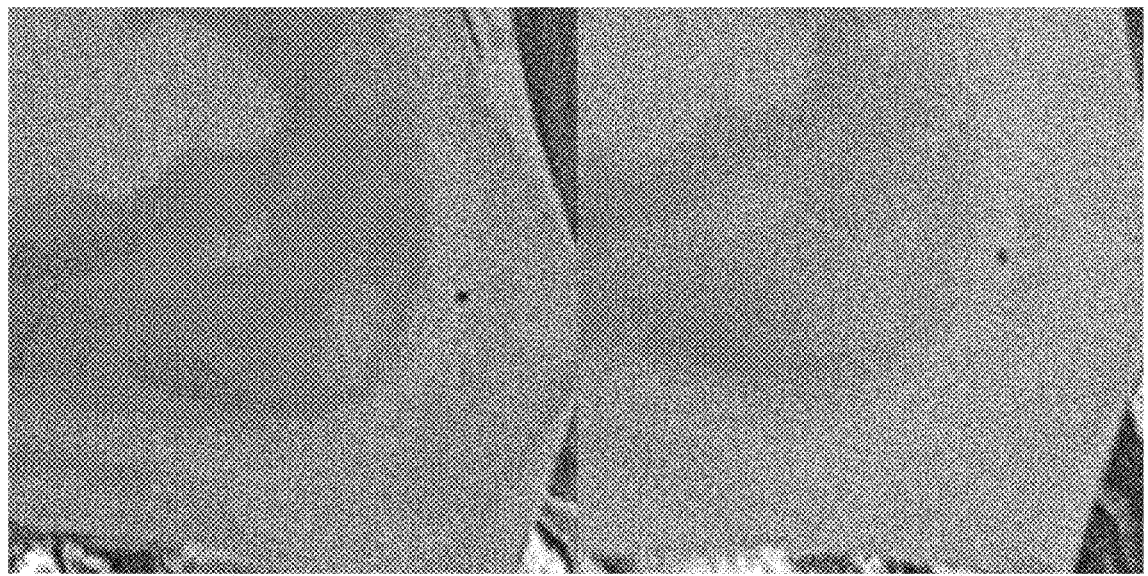
FIG. 8 is an optical image of a dip-molded article including a polydiacetylene-derived layer which is color-shifted from blue to red due to exposure to n-hexane according to Example 3.
Figure 9:
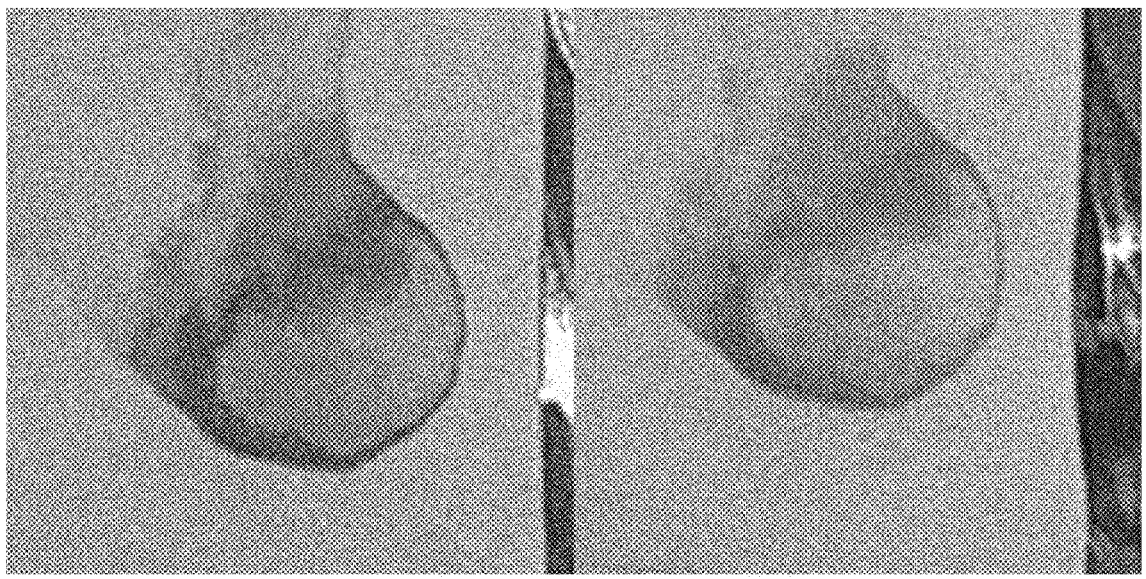
FIG. 9 is an optical image of a dip-molded article including a polydiacetylene-derived layer which is color-shifted from blue to red due to exposure to hydrochloric acid (HCl) gas according to Example 4.
Figure 10:
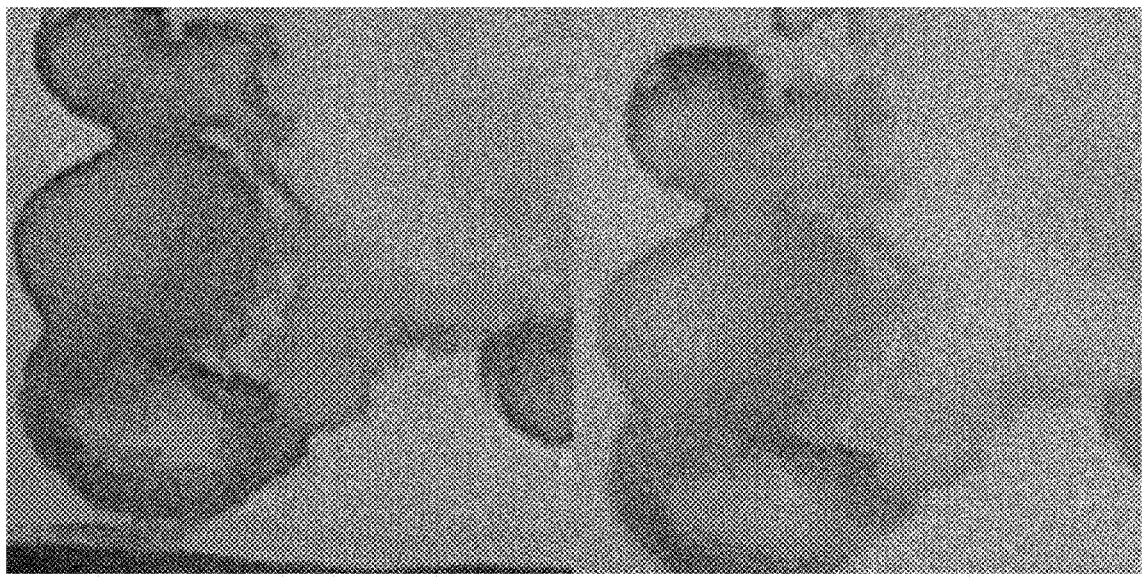
FIG. 10 is an optical image of a dip-molded article including a polydiacetylene-derived layer which is color-shifted from blue to red due to exposure to sulfuric acid ($H_2SO_4$) gas according to Example 5.
Figure 11:
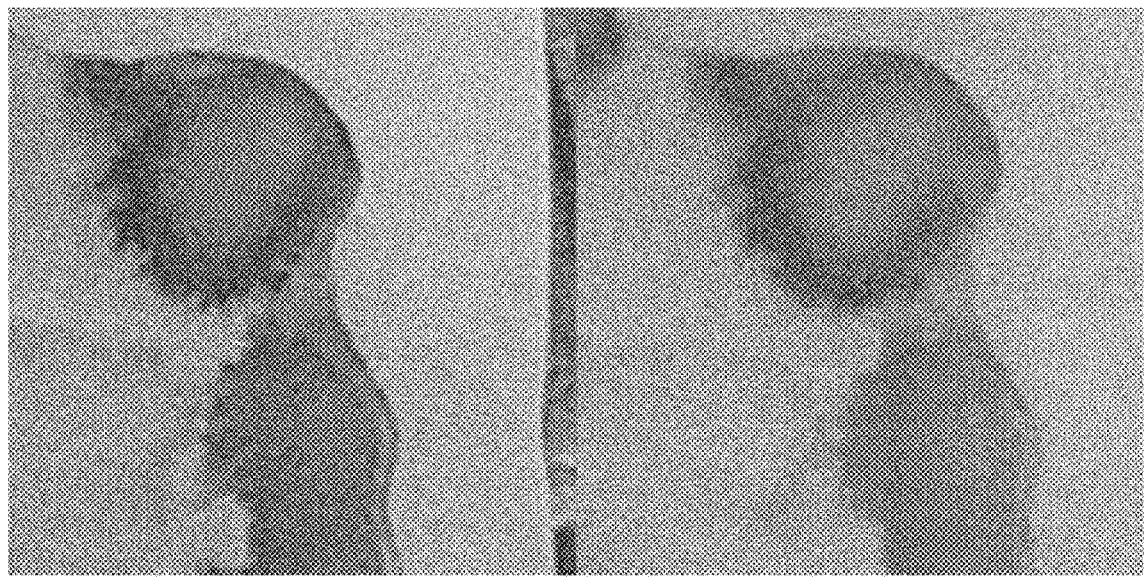
FIG. 11 is an optical image of a dip-molded article including a polydiacetylene-derived layer which is color-shifted from blue to red due to exposure to ammonia ($NH_4OH$) gas according to Example 1.

According to an embodiment of the present invention, the polymer including the repeating unit derived from the diacetylene-based compound may be a polymer formed by respective movements of two acetylene group radicals present in a diacetylene-based compound and a reaction between compounds by exposing the diacetylene-based compound as a monomer to UV light. The polymer including the repeating unit derived from the diacetylene-based compound according to the present invention may be a blue polymer exhibiting a maximum absorption wavelength at about 650 nm and the polymer may be discolored, i.e., color-shifted to red depending on temperature, change in pH, exposure to an organic solvent, change in external environment such as additional ultraviolet irradiation, and the like, and may express red fluorescence (see FIGS. 1 and 2). Further, according to an embodiment of the present invention, the organic solvent may be an organic solvent such as chloroform, tetrahydrofuran (THF), hexane, and toluene, and the like. The kind of organic solvent in which discoloration is generated may be determined depending on the kind of substituent substituted in the compound represented by Chemical Formula 1 below.

In other words, the dip-molded article according to the present invention includes the layer derived from the polymer including the repeating unit derived from the diacetylene-based compound, thereby providing a separate fluorescent layer capable of allowing the user to visually confirm the presence or absence of defects of the dip-molded article, such as internal penetration or the like, of organic solvents, acids, bases, and the like, by recognizing a change in the use environment according to exposure to the organic solvents, the acids, the bases, and the like, of the dip-molded article, thus securing the use safety of the user.

Further, according to an embodiment of the present invention, the layer derived from the polymer including the repeating unit derived from the diacetylene-based compound may be included in part or all of the inside or the surface of the dip-molded article. As a specific example, the layer derived from the polymer including the repeating unit derived from the diacetylene-based compound may be a layer formed on part or all of the surface of the layer derived from the latex composition for dip-molding after the layer derived from the latex composition for dip-molding is formed at the time of dip-molding the dip-molded article using a dip-molding frame, which is formed inside or on the surface of the dip-molded article depending on the use form of the dip-molded article.

Meanwhile, according to an embodiment of the present invention, the diacetylene-based compound may be a compound represented by Chemical Formula 1 below:

[Chemical Formula 1]

in Chemical Formula 1 above, A and B may be each independently hydrogen, a monovalent hydrocarbon group having 1 to 30 carbon atoms, or a monovalent hydrocarbon group having 1 to 30 carbon atoms including at least one kind of one or more hetero atoms, $L_1$ and $L_2$ may be each independently a divalent hydrocarbon group having 1 to 30 carbon atoms, or a divalent hydrocarbon group having 1 to 30 carbon atoms including at least one or more hetero atoms, d and g may be each independently 0, 1 or 2, provided that d+g is 0, 1 or 2, and e and f may be each independently an integer selected from 1 to 50, provided that e+f may be an integer selected from 2 to 50. Meanwhile, when A and B are each hydrogen, and d and g are each 1 or more, each of $L_1$ and $L_2$ may be a monovalent substituent in which a monovalent group of a divalent group is substituted with hydrogen.

As a specific example, in Chemical Formula 1 above, A and B may be each independently an alkyl group having 1 to 10 carbon atoms; an unsubstituted, N-substituted or N,N'-substituted amino group with an alkyl group having 1 to 10 carbon atoms; a carboxyl group; a maleimide group; a biotin group; an N-hydrosuccinimide group; a benzoic acid group; or an activated ester group, $L_1$ and $L_2$ may be each independently a linking group derived from polyethylene oxide having 2 to 10 carbon atoms; an unsubstituted or N-substituted amino group with an alkyl group having 1 to 10 carbon atoms; a linking group derived from amide; a linking group derived from ester; or a linking group derived from a carboxyl group, d and g may be each independently 0, 1 or 2, provided that d+g may be 0, 1 or 2, and e and f may be each independently an integer selected from 1 to 50, provided that e+f may be an integer selected from 2 to 50.

As a more specific example, in Chemical Formula 1 above, A and B may be each independently an alkyl group having 1 to 5 carbon atoms; an unsubstituted, N-substituted or N,N'-substituted amino group with an alkyl group having 1 to 10 carbon atoms; a carboxyl group; a maleimide group; a biotin group; an N-hydrosuccinimide group; a benzoic acid group; or an activated ester group, d and g each may be 0, and e and f may be each independently an integer selected from 1 to 20, provided that e+f may be an integer selected from 2 to 20. Within this range, there is an effect of facilitating color shift and fluorescence expression with respect to an organic solvent while not affecting physical properties of the dip-molded article.

Further, according to an embodiment of the present invention, the compound represented by Chemical Formula 1 may be one selected from the group consisting of compounds represented by Chemical Formulas 1-1 to 1-5 below. In this case, it is possible to visually confirm the presence or absence of defects of the dip-molded article, such as internal penetration or the like, of toluene, methanol, hexane, hydrochloric acid, sulfuric acid, ammonia, and the like, of the dip-molded article, thereby securing the use safety of the user:

[Chemical Formula 1-1]

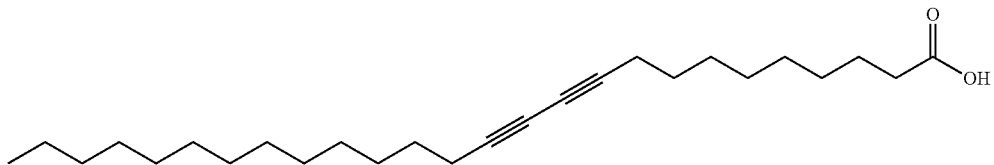

[Chemical Formula 1-2]

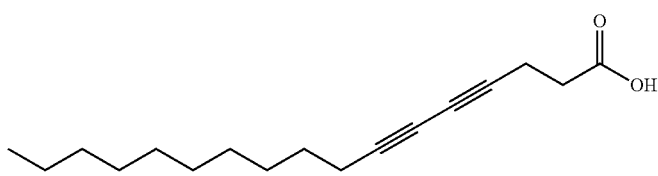

[Chemical Formula 1-3]

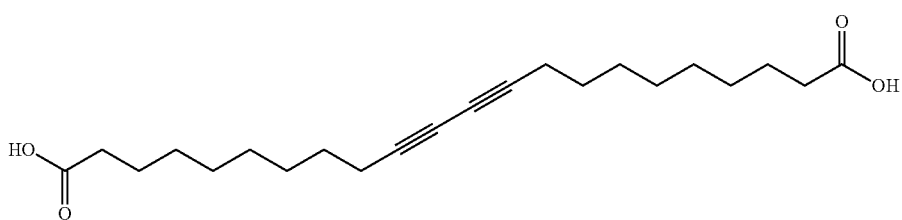

[Chemical Formula 1-4]

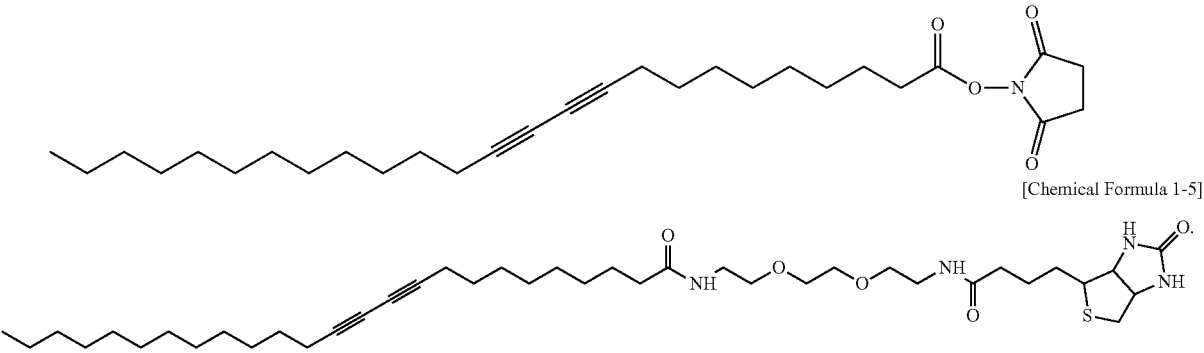

[Chemical Formula 1-5]

Meanwhile, according to an embodiment of the present invention, the repeating unit derived from the compound represented by Chemical Formula 1 may be represented by Chemical Formula 2 below:

[Chemical Formula 2]

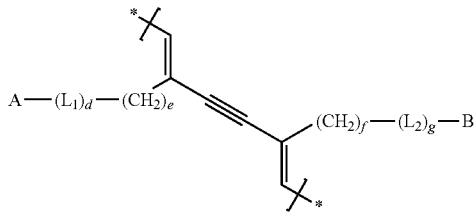

in Chemical Formula 2 above, the definition of each substituent may be the same as the definition of the substituent described in Chemical Formula 1 above. In other words, the repeating unit derived from the compound represented by Chemical Formula 1 of the present invention may be formed by respective movements of two acetylene group radicals of the compound represented by Chemical Formula 1 and a reaction between compounds as described in the repeating unit represented by Chemical Formula 2 above.

Further, according to an embodiment of the present invention, the layer derived from the latex composition for dip-molding may be a layer derived from at least one cross-linked copolymer selected from the group consisting of a cross-linked nitrile-based copolymer and a cross-linked carboxylic acid-modified nitrile-based copolymer. Further, as a specific example, the cross-linked nitrile-based copolymer and the cross-linked carboxylic acid-modified nitrile-based copolymer may include at least one cross-linking agent-derived cross-linking part selected from the group consisting of sulfur and a vulcanization accelerator; and zinc oxide. That is, according to an embodiment of the present invention, the layer derived from the latex composition for dip-molding may be a derived layer formed by dip-molding a latex composition for dip-molding including at least one copolymer selected from the group consisting of a nitrile-based copolymer and a carboxylic acid-modified nitrile-based copolymer, and a cross-linking agent.

According to an embodiment of the present invention, the nitrile-based copolymer may include an ethylenically unsaturated nitrile-based monomer-derived repeating unit and a conjugated diene-based monomer-derived repeating unit.

Further, according to an embodiment of the present invention, the carboxylic acid-modified nitrile-based copolymer may include an ethylenically unsaturated nitrile-based monomer-derived repeating unit, a conjugated diene-based monomer-derived repeating unit, and an ethylenically unsaturated acid monomer-derived repeating unit.

According to an embodiment of the present invention, an ethylenically unsaturated nitrile-based monomer forming the ethylenically unsaturated nitrile-based monomer-derived repeating unit of the nitrile-based copolymer and the carboxylic acid-modified nitrile-based copolymer may be at least one selected from the group consisting of acrylonitrile, methacrylonitrile, fumaronitrile, α-chloronitrile and α-cyanoethyl acrylonitrile. Specifically, the ethylenically unsaturated nitrile-based monomer may be acrylonitrile and methacrylonitrile, and more specifically, may be acrylonitrile. An amount of the ethylenically unsaturated nitrile-based monomer-derived repeating unit of the nitrile-based copolymer and the carboxylic acid-modified nitrile-based copolymer may be each independently 10 wt % to 50 wt %, 15 wt % to 45 wt %, or 20 wt % to 40 wt % based on the total amount of the nitrile-based copolymer or the carboxylic acid-modified nitrile-based copolymer. Within this range, a dip-molded article molded from the latex composition for dip-molding including the nitrile-based copolymer or the carboxylic acid-modified nitrile-based copolymer is flexible and has an excellent wearing feeling and excellent oil resistance and tensile strength.

Further, according to an embodiment of the present invention, a conjugated diene-based monomer forming the conjugated diene-based monomer-derived repeating unit of the nitrile-based copolymer and the carboxylic acid-modified nitrile-based copolymer may be at least one selected from the group consisting of 1,3-butadiene, 2,3-dimethyl-1,3-butadiene, 2-ethyl-1,3-butadiene, 1,3-pentadiene, and isoprene. More specifically, the conjugated diene-based monomer may be 1,3-butadiene or isoprene, and further specifically, 1,3-butadiene. An amount of the conjugated diene-based monomer-derived repeating unit included in the nitrile-based copolymer may be 50 wt % to 90 wt %, 55 wt % to 85 wt %, or 60 wt % to 80 wt % based on the total amount of the nitrile-based copolymer. An amount of the conjugated diene-based monomer-derived repeating unit included in the carboxylic acid-modified nitrile-based copolymer may be 40 wt % to 89 wt %, 40 wt % to 80 wt %, or 50 wt % to 78 wt % based on the total amount of the carboxylic acid-modified nitrile-based copolymer. Within this range, a dip-molded article molded from the latex composition for dip-molding including the carboxylic acid-modified nitrile-based copolymer is flexible and has an excellent wearing feeling and excellent oil resistance and tensile strength.

Further, according to an embodiment of the present invention, the ethylenically unsaturated acid monomer forming the ethylenically unsaturated acid monomer-derived repeating unit of the carboxylic acid-modified nitrile-based copolymer may be an ethylenically unsaturated monomer containing an acid group such as a carboxyl group, a sulfonic acid group or an acid anhydride group. Specific examples of the ethylenically unsaturated acid monomer may include ethylenically unsaturated carboxylic acid monomers such as acrylic acid, methacrylic acid, itaconic acid, maleic acid, and fumaric acid, and the like; polycarboxylic anhydrides such as maleic anhydride, and citraconic anhydride, and the like; ethylenically unsaturated sulfonic acid monomers such as styrenesulfonic acid; and ethylenically unsaturated polycarboxylic acid partial ester monomers such as monobutyl fumarate, monobutyl maleate, mono-2-hydroxypropyl maleate, and the like. More specifically, the ethylenically unsaturated acid monomer may be at least one selected from the group consisting of acrylic acid, methacrylic acid, itaconic acid, maleic acid, fumaric acid, and the like, and more preferably methacrylic acid. The ethylenically unsaturated acid monomer may be used in the form of a salt such as an alkali metal salt, an ammonium salt, or the like, at the time of polymerization. Further, an amount of the ethylenically unsaturated acid monomer-derived repeating unit may be 0.1 wt % to 15 wt %, 0.5 wt % to 9 wt %, or 1 wt % to 8 wt % based on the total amount of the carboxylic acid-modified nitrile-based copolymer. Within this range, the dip-molded article formed from the latex composition for dip-molding including the carboxylic acid-modified nitrile-based copolymer is flexible and has an excellent wearing feeling and excellent tensile strength.

According to an embodiment of the present invention, the nitrile-based copolymer and the carboxylic acid-modified nitrile-based copolymer each may further include an ethylenically unsaturated monomer-derived repeating unit which is derived from an ethylenically unsaturated monomer which is capable of being copolymerized with a conjugated diene-based monomer, an ethylenically unsaturated nitrile-based monomer, and an ethylenically unsaturated acid monomer.

According to an embodiment of the present invention, the ethylenically unsaturated monomer forming the ethylenically unsaturated monomer-derived repeating unit may be at least one selected from the group consisting of aromatic vinyl monomers such as styrene, aryl styrene, vinyl naphthalene, and the like; fluoroalkyl vinyl ethers such as fluoroethyl vinyl ether and the like; ethylenically unsaturated amide monomers such as (meth)acrylamide, N-methylol (meth)acrylamide, N,N-dimethylol (meth)acrylamide, N-methoxymethyl (meth)acrylamide, N-propoxymethyl (meth)acrylamide, and the like; non-conjugated monomers such as vinylpyridine, vinylnorbornene, dicyclopentadiene, 1,4-hexadiene, and the like; ethylenically unsaturated carboxylic acid ester monomers such as methyl (meth)acrylate, ethyl (meth)acrylate, butyl (meth)acrylate, 2-ethylhexyl (meth)acrylate, trifluoroethyl (meth)acrylate, tetrafluoropropyl (meth)acrylate, dibutyl maleate, dibutyl fumarate, diethyl maleate, methoxymethyl (meth)acrylate, ethoxyethyl (meth)acrylate, methoxyethoxyethyl (meth)acrylate, cyanomethyl (meth)acrylate, 2-cyanoethyl (meth)acrylate, 1-cyanopropyl (meth) acrylate, 2-ethyl-6-cyanohexyl (meth) acrylate, 3-cyanopropyl (meth) acrylate, hydroxyethyl (meth) acrylate, hydroxypropyl (meth)acrylate, glycidyl (meth)acrylate, dimethylaminoethyl (meth)acrylate, and the like. Further, when the ethylenically unsaturated monomer-derived repeating unit is included, an amount of the ethylenically unsaturated monomer-derived repeating unit may be 0.01 wt % to 20 wt % based on the total amount of the carboxylic acid-modified nitrile-based copolymer. Within this range, the balance between tensile strength and soft feeling of the dip-molded article may be excellent.

Further, according to an embodiment of the present invention, sulfur in the cross-linking agent for crosslinking the nitrile-based copolymer and the carboxylic acid-modified nitrile-based copolymer to form the cross-linking agent-derived cross-linking part is a vulcanization agent for vulcanizing the latex composition for dip-molding, and may be sulfur such as powdered sulfur, precipitated sulfur, colloidal sulfur, surface treated sulfur, insoluble sulfur, and the like. When the cross-linking part is formed by including sulfur, an amount of sulfur may be 0.1 parts by weight to 10 parts by weight or 1 part by weight to 5 parts by weight based on 100 parts by weight (based on the solid content) of the total amount of the nitrile-based copolymer and the carboxylic acid-modified nitrile-based copolymer in the latex composition for dip-molding. Within this range, the cross-linking ability is excellent.

In addition, according to an embodiment of the present invention, the vulcanization accelerator of the cross-linking agent may be one selected from the group consisting of 2-mercaptobenzothiazole (MBT), 2,2-dithiobisbenzothiazole-2-sulfenamide (MBTS), N-cyclohexylbenzothiazole-2-sulfenamide (CBS), 2-morpholinothiobenzothiazole (MBS), tetramethylthiuram monosulfide (TMTM), tetramethylthiuram disulfide (TMTD), zinc diethyldithiocarbamate (ZDEC), zinc di-n-butyldithiocarbamate (ZDBC), diphenylguanidine (DPG), and di-o-tolylguanidine. When the cross-linking part is formed by including vulcanization accelerator, an amount of the vulcanization accelerator may be 0.1 parts by weight to 10 parts by weight or 0.5 parts by weight to 5 parts by weight based on 100 parts by weight (based on the solid content) of the total amount of the nitrile-based copolymer and the carboxylic acid-modified nitrile-based copolymer in the latex composition for dip-molding. Within this range, the cross-linking ability is excellent.

Further, according to an embodiment of the present invention, the zinc oxide in the cross-linking agent may be present in a form mixed with a zinc oxide solution in the latex composition for dip-molding, wherein the zinc oxide solution may include zinc oxide, ammonium carbonate, ammonia water, and water. An amount of zinc oxide in the zinc oxide solution may be 1 wt % to 20 wt %, or 1 wt % to 15 wt %, and within this range, the cross-linking ability is excellent, the latex stability is excellent, and the prepared dip-molded article has excellent tensile strength and flexibility.

Meanwhile, according to an embodiment of the present invention, the latex composition for dip-molding may have a glass transition temperature of −50° C. to −15° C., or −45° C. to −20° C. Within this range, the article obtained by dip-molding the latex composition for dip-molding may have less stickiness while preventing generation of cracks and deterioration of tensile properties such as the tensile strength and the like, thus having an excellent wearing feeling. The glass transition temperature may be measured using a differential scanning calorimetry method.

Further, according to an embodiment of the present invention, an average particle size of nitrile-based copolymer particles and carboxylic acid-modified nitrile-based copolymer particles in the latex composition for dip-molding may be 100 nm to 500 nm, 100 nm to 200 nm, 110 nm to 180 nm, or 120 nm to 150 nm. Within this range, the article obtained by dip-molding the latex composition for dip-molding may have excellent tensile properties such as tensile strength and the like, and a viscosity of the latex is not increased, and thus the latex may be prepared at a high concentration. The average particle size may be measured using a laser scattering analyzer (Nicomp).

In addition, according to an embodiment of the present invention, the latex composition for dip-molding may have a solid content (concentration) of 10 wt % to 40 wt %, 15 wt % to 35 wt %, or 18 wt % to 33 wt %. Within this range, an efficiency of transporting latex is excellent, and storage stability is excellent by preventing an increase in latex viscosity.

As another example, the latex composition for dip-molding may have a pH of 8 to 12, 9 to 11, or 9.3 to 10.5. Within this range, the processability and productivity are excellent at the time of preparing a dip-molded article. The pH of the latex composition for dip-molding may be adjusted by the addition of the pH adjuster described below. The pH adjuster may be, for example, an aqueous solution of potassium hydroxide having a concentration of 1 wt % to 5 wt %, or ammonia water having a concentration of 1 wt % to 5 wt %.

According to an embodiment of the present invention, the article may be a glove, such as a surgical glove, an inspection glove, an industrial glove, a household glove, or the like, a condom, a catheter, or a health care product.

Further, the present invention provides a latex composition for dip-molding for molding the above dip-molded article. The latex composition for dip-molding may be a latex composition for dip-molding to form the layer derived from the latex composition for dip-molding and the layer derived from the polymer including the repeating unit derived from the diacetylene-based compound as described above.

According to an embodiment of the present invention, the latex composition for dip-molding may include at least one copolymer selected from the group consisting of a nitrile-based copolymer and a carboxylic acid-modified nitrile-based copolymer for forming the layer derived from the latex composition for dip-molding; and a diacetylene-based compound for forming the layer derived from the polymer including the repeating unit derived from the diacetylene-based compound. In other words, the latex composition for dip-molding according to the present invention may simultaneously include the copolymer for forming the layer derived from the latex composition for dip-molding and the diacetylene compound for forming the layer derived from the polymer including the repeating unit derived from the diacetylene-based compound.

According to an embodiment of the present invention, at least one copolymer selected from the group consisting of the nitrile-based copolymer and the carboxylic acid-modified nitrile-based copolymer; and the diacetylene-based compound may be the same as those described above.

Further, the latex composition for dip-molding may further include a cross-linking agent for cross-linking at the time of molding the dip-molded article in addition to at least one copolymer selected from the group consisting of the nitrile-based copolymer and the carboxylic acid-modified nitrile-based copolymer; and the diacetylene-based compound, and the cross-liking agent may be the same as described above.

Further, there is provided a preparation method of a dip-molded article for preparing the dip-molded article. The preparation method of the dip-molded article may include immersing the latex composition for dip-molding by a direct immersion method, an anode adhesion immersion method, a Teague adhesion immersion method, or the like. As a specific example, the preparation method of the dip-molded article may be performed by anode adhesion immersion method, and in this case, there is an advantage of obtaining a dip-molded article having a uniform thickness.

As a specific example, the preparation method of the dip-molded article may include attaching a coagulant to a dip-molding frame (S100); immersing the dip-molding frame having the coagulant attached thereto in a latex composition for dip-molding to form a layer derived from a latex composition for dip-molding (S200); and forming a layer derived from a polymer including a repeating unit derived from a diacetylene-based compound (S300).

According to an embodiment of the present invention, step (S100) is to attach the coagulant to a surface of the dip-molding frame by immersing the dip-molding frame in a coagulant solution so as to form the coagulant in the dip-molding frame, wherein the coagulant solution is a solution in which the coagulant is dissolved in water, an alcohol or a mixture thereof, and an amount of the coagulant in the coagulant solution may be 5 wt % to 50 wt %, or 10 wt % to 40 wt % based on the total amount of the coagulant solution. The coagulant may be, for example, at least one selected from the group consisting of metal halides such as barium chloride, calcium chloride, magnesium chloride, zinc chloride, and aluminum chloride, and the like; nitrates such as barium nitrate, calcium nitrate, and zinc nitrate, and the like; acetic acid salts such as barium acetate, calcium acetate, and zinc acetate, and the like; and sulfates such as calcium sulfate, magnesium sulfate, and aluminum sulfate, and the like. The coagulant may be specifically calcium chloride or calcium nitrate.

Further, according to an embodiment of the present invention, the step (S200) may be performed, in order to form the dip-molding layer, by immersing the dip-molding frame having a coagulant attached thereto in the latex composition for dip-molding, taking out the dip-molding frame, and forming the layer derived from the latex composition for dip-molding in the dip-molding frame. As a specific example, step (S200) may be repeated at least twice, if necessary. In this case, the layer derived from the latex composition for dip-molding is further strengthened, and thus the dip-molded article may have excellent mechanical properties such as tensile properties, durability, and the like.

In addition, according to an embodiment of the present invention, step (S200) may further include, after the immersing, drying and heating to completely form the layer derived from the latex composition for dip-molding having attached to the dip-molding frame. During the drying and heating, liquid components such as water, and the like, are first evaporated, and curing may be performed through a cross-linking reaction between the nitrile-based copolymer and the carboxylic acid-modified nitrile-based copolymer, and the cross-linking agent in the latex composition for dip-molding.

Meanwhile, according to an embodiment of the present invention, the latex composition for dip-molding in step (S200) may be prepared by polymerizing a nitrile-based copolymer or polymerizing a carboxylic acid-modified nitrile-based copolymer to prepare a nitrile-based copolymer latex or a carboxylic acid-modified nitrile-based copolymer latex (S10); and adding and mixing at least one cross-linking agent selected from the group consisting of sulfur and a vulcanization accelerator; and zinc oxide to the nitrile-based copolymer latex or the carboxylic acid-modified nitrile-based copolymer latex prepared in step (S10) (S20).

According to an embodiment of the present invention, the polymerization of the nitrile-based copolymer or the carboxylic acid-modified nitrile-based copolymer in step (S10) may be performed by emulsion polymerization. The polymerization may be performed by polymerization of a monomer mixture, and each monomer included in the monomer mixture may be added with reference to the kind and amount of the monomers described above, and may be added at a time or continuously.

Meanwhile, at the time of the polymerization in step (S10), the monomer mixture may be added to a polymerization reactor simultaneously prior to the polymerization, or a part of the monomer mixture may be added to the polymerization reactor first and then the remaining monomer mixture may be added after the polymerization is initiated. Further, at the time of the polymerization in step (S10), the polymerization may be performed by adding a glycidyl ether-based compound together with the monomer mixture. In this case, a glycidyl ether-based compound-derived cross-linking part may be formed in the carboxylic acid-modified nitrile-based copolymer prepared by the polymerization in step (S10).

Further, according to an embodiment of the present invention, the polymerization in step (S10) may be performed in the presence of an emulsifier, a polymerization initiator, a molecular weight modifier, and the like.

When the polymerization is performed by including the emulsifier, the emulsifier may be at least one selected from the group consisting of an anionic surfactant, a nonionic surfactant, a cationic surfactant and an amphoteric surfactant. Specific examples of the emulsifier may include at least one anionic surfactant selected from the group consisting of alkylbenzenesulfonic acid salts, aliphatic sulfonic acid salts, higher alcohol sulfuric acid ester salts, α-olefin sulfonic acid salts, and alkyl ether sulfuric acid ester salts. Further, the emulsifier may be added in an amount of 0.3 to 10 parts by weight, 0.8 to 8 parts by weight, or 1.5 to 6 parts by weight based on 100 parts by weight of the total amount of the monomer mixture. Within this range, polymerization stability is excellent and a bubble generation amount is small, thus facilitating the preparing of the molded article.

Further, when the polymerization in step (S10) is performed by including the polymerization initiator, the polymerization initiator may be at least one selected from the group consisting of inorganic peroxides such as sodium persulfate, potassium persulfate, ammonium persulfate, potassium perphosphate, and hydrogen peroxide, and the like; organic peroxides such as t-butyl peroxide, cumene hydroperoxide, p-menthane hydroperoxide, di-t-butyl peroxide, t-butyl cumyl peroxide, acetyl peroxide, isobutyl peroxide, octanoyl peroxide, dibenzoyl peroxide, 3,5,5-trimethylhexanol peroxide, and t-butyl peroxyisobutyrate, and the like; and nitrogen compounds such as azobisisobutylonitrile, azobis-2,4-dimethylvaleronitrile, azobiscyclohexanecarbonitrile, and azobis isobutyric acid (butyl acid) methyl, and the like. As a specific example, the polymerization initiator may be an inorganic peroxide, and more specifically, a persulfate. Further, the polymerization initiator may be added in an amount of 0.01 to 2 parts by weight, 0.02 to 1.5 parts by weight, or 0.05 to 1 part by weight based on 100 parts by weight of the total amount of the monomer mixture. Within this range, a polymerization rate may be easily adjusted.

Further, when the polymerization in step (S10) is performed by including a molecular weight modifier, the molecular weight modifier may be, for example, at least one selected from the group consisting of an α-methylstyrene dimer; mercaptans such as t-dodecylmercaptan, n-dodecylmercaptan and octylmercaptan, and the like; halogenated hydrocarbons such as carbon tetrachloride, methylene chloride, and methylene bromide, and the like; and sulfur-containing compounds such as tetraethylthiuram disulfide, dipentamethylenethiuram disulfide, diisopropylxanthogen disulfide, and the like, and may be specifically, t-dodecylmercaptan. Further, the molecular weight modifier may be added in an amount of 0.1 to 2 parts by weight, 0.2 to 1.5 parts by weight, or 0.3 to 1.0 part by weight based on 100 parts by weight of the total amount of the monomer mixture. Within this range, the polymerization stability is excellent, and physical properties of the article are excellent when the article is prepared after polymerization.

Further, according to an embodiment of the present invention, the polymerization in step (S10) may be performed by including an activator, and the activator may be, for example, at least one selected from the group consisting of sodium formaldehyde, sulfoxylate, sodium ethylenediamine tetraacetate, ferrous sulfate, dextrose, sodium pyrophosphate, and sodium sulfite.

Further, according to an embodiment of the present invention, the polymerization may be performed in water, specifically deionized water, as a medium. In order to ensure polymerization easiness, the polymerization may be performed by further including an additive such as a chelating agent, a dispersant, a pH adjuster, a deoxidizer, a particle size regulator, an antioxidant, an oxygen scavenger, or the like, if necessary. According to an embodiment of the present invention, the emulsifier, the polymerization initiator, the molecular weight modifier, the additive, and the like, may be added to a polymerization reactor at a time or separately, and may be continuously added at the time of each addition which is the same as the monomer mixture.

Further, according to an embodiment of the present invention, the polymerization in step (S10) may be performed at a polymerization temperature of 10° C. to 90° C., 20° C. to 80° C., or 25° C. to 75° C. Within this range, latex stability is excellent.

Further, according to an embodiment of the present invention, the polymerization in step (S10) may further include, after the polymerization is completed, obtaining a carboxylic acid-modified nitrile-based copolymer latex by terminating the polymerization reaction. The polymerization reaction may be terminated at a polymerization conversion rate of 90% or more, or 90% to 99.9%, or 93% to 99%, and may be performed by adding a polymerization terminator, a pH adjuster, and an antioxidant. Further, the preparation method of the carboxylic acid-modified nitrile-based copolymer latex may further include removing unreacted monomers by a deodorization process after the reaction is terminated.

Further, according to an embodiment of the present invention, step (S20) is to add and mix at least one cross-linking agent selected from the group consisting of sulfur and a vulcanization accelerator; and zinc oxide to the nitrile-based copolymer latex or the carboxylic acid-modified nitrile-based copolymer latex prepared in step (S10), thereby preparing a latex composition for dip-molding in which the cross-liking agent is dispersed in the nitrile-based copolymer latex or the carboxylic acid-modified nitrile-based copolymer latex, wherein the cross-linking agent may be added with reference to the kind, the amount, and the form as described above.

Meanwhile, according to an embodiment of the present invention, the latex composition for dip-molding may be prepared by further including adding and stirring the diacetylene-based compound to each copolymer latex produced in step (S10) after step (S20) or simultaneously with step (S20) (S30).

In addition, step (S300) according to an embodiment of the present invention may be a step for forming the layer derived from the polymer including the repeating unit derived from the diacetylene-based compound, i.e., a fluorescent layer.

According to an embodiment of the present invention, step (S300) may be performed by forming a layer derived from a latex composition for dip-molding from a latex composition for dip-molding including a diacetylene-based compound (S200), and forming the layer derived from the polymer including the repeating unit derived from the diacetylene-based compound, which is made from the diacetylene-based compound attached to the surface or inside of the layer derived from the latex composition for dip-molding after the layer derived from the latex composition for dip-molding in step (S200) is formed, or may be performed by forming a layer derived from a latex composition for dip-molding from a latex composition for dip-molding without including a diacetylene-based compound (S200), and immersing a dip-molding frame having the layer derived from the latex composition for dip-molding prepared in step (S200) in a monomer solution including a diacetylene-based compound.

Further, according to an embodiment of the present invention, step (S300) may further include, after completion of step (S200), or after immersion in the monomer solution including the diacetylene-based compound, drying and UV irradiation so that the layer derived from the polymer including the repeating unit derived from the diacetylene-based compound is completely formed from the diacetylene-based compound attached to the layer derived from the latex composition for dip-molding. During the drying, liquid components such as water and the like, are first evaporated, and photopolymerization between the diacetylene-based compounds may be performed by UV irradiation.

According to an embodiment of the present invention, the UV irradiation may be performed for 5 seconds to 5 minutes by UV light having a wavelength of 220 nm to 350 nm. Within this range, photopolymerization between the diacetylene-based compounds may be easily performed, and side reactions are minimized.

Further, according to an embodiment of the present invention, the monomer solution may include the diacetylene-based compound and an organic solvent for dissolving the diacetylene-based compound. The organic solvent may be one selected from the group consisting of dimethylformamide (DMF), dimethylsulfoxide (DMSO), chloroform, dichloromethane, hexane, tetrahydrofuran (THF), acetone, and alcohol. In this case, when the diacetylene-based compound is present in a stable state before being exposed to UV light, and the organic solvent is easily removed at the time of drying before the photopolymerization is performed and at the time of drying the dip-molding frame having the layer derived from the latex composition for dip-molding attached thereto.

Meanwhile, according to an embodiment of the present invention, the monomer solution may be prepared by adding the diacetylene-based compound to the organic solvent, adding the mixture into water, followed by ultrasonic treatment at 50° C. to 100° C. for 1 minute to 1 hour, or 10 minutes to 50 minutes. In this case, the diacetylene-based compound is uniformly dispersed in the monomer solution.

According to an embodiment of the present invention, the preparation method of the dip-molded article may include removing the dip-molded article from the dip-molding frame through processes such as delamination, and the like, the dip-molded article having the layer derived from the polymer including the repeating unit derived from the diacetylene-based compound prepared in step S300, thereby obtaining the dip-molded article.

Hereinafter, the following Examples of the present invention are described in more detail. It is obvious to those skilled in the art, however, that the following Examples are illustrative of the present invention and that various changes and modifications can be made within the scope and spirit of the invention, and thus the scope of the present invention is not limited thereto.

EXAMPLE

Example 1

<Preparation of Latex Composition for Dip-Molding>

A 10 L high-pressure polymerization reactor was substituted with nitrogen, the polymerization reactor was equipped with an agitator, a thermometer, a cooler, a nitrogen gas inlet and an inlet so that a monomer, an emulsifier, and a polymerization initiator were capable of being continuously added, then 100 parts by weight of a monomer mixture including 25 wt % of acrylonitrile, 70 wt % of 1,3-butadiene, and 5 wt % of methacrylic acid, and 2.5 parts by weight of sodium dodecylbenzenesulfonate, 0.5 parts by weight of t-dodecyl mercaptan, and 140 parts by weight of water based on 100 parts by weight of the monomer mixture were added, and the mixture was heated to 40° C. After the temperature of the reactor reached 40° C., 0.25 parts by weight of potassium persulfate as a polymerization initiator was added to perform polymerization. When a polymerization conversion rate reached 95%, 0.1 parts by weight of sodium dimethyldithiocarbamate was added to terminate the polymerization. Subsequently, unreacted monomers were removed through a deodorization process, and ammonia water, an antioxidant, and a defoaming agent were added to obtain a carboxylic acid-modified nitrile-based copolymer latex having a solid content concentration of 45 wt % and a pH of 8.5. Here, a glass transition temperature of the prepared carboxylic acid-modified nitrile-based copolymer latex was −30° C., and an average particle size of the carboxylic acid-modified nitrile-based copolymer in the latex was 120 nm.

Subsequently, to 100 parts by weight (based on solid content) of the obtained carboxylic acid-modified nitrile-based copolymer latex, 2 parts by weight of a potassium hydroxide solution having a concentration of 1.25 wt %, 1.2 parts by weight of sulfur powder, 0.7 parts by weight of di-n-butyldithiocarbamate zinc, and secondary distilled water were added to obtain a latex composition for dip-molding having a solid content concentration of 18 wt % and a pH of 10.0.

<Preparation of Monomer Solution>

Separately from the preparation of the latex composition for dip-molding, 140 mg of 10,12-pentacosadinoic acid (PCDA), which is a compound represented by Chemical Formula 1-1 below, was dissolved in 3 ml of dimethyl-sulfoxide (DMSO). Thereafter, 400 ml of water was added to the solution in which the compound represented by Chemical Formula 1-1 below was dissolved, and the mixture was subjected to ultrasonic treatment at 80° C. for 30 minutes to disperse the compound represented by Chemical Formula 1-1 below. Next, the monomer solution in which the compound represented by Chemical Formula 1-1 below was dispersed was filtered using a filter of 0.8 μm and cooled at 4° C. for 12 hours to obtain a monomer solution.

[Chemical Formula 1-1]

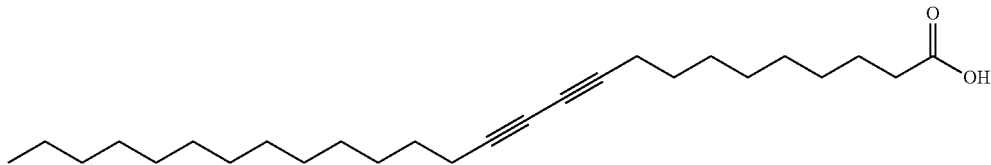

<Preparation of Dip-Molded Article>

18 parts by weight of calcium nitrate, 81.5 parts by weight of water, and 0.5 part by weight of a wetting agent (Teric 320, Huntsman Corporation, Australia) were mixed to prepare a coagulant solution. A hand-shaped ceramic mold was immersed in the prepared coagulant solution for 3 minutes, and then taken out and dried at 80° C. for 4 minutes to coat the coagulant onto the hand-shaped mold.

Thereafter, the mold coated with the coagulant was immersed in the obtained latex composition for dip-molding for 3 minutes, taken out, and dried at 80° C. for 2 minutes. Then, the hand-shaped mold was immersed in the monomer solution for 3 minutes, taken out, dried at 40° C. for 10 minutes, and irradiated with UV light having a wavelength of 256 nm for 15 seconds. The dip-molded article was peeled off from the hand-shaped mold to obtain a glove-shaped dip-molded article.

Example 2

Example 2 was performed in the same manner as in Example 1 except that 140 mg of the compound represented by Chemical Formula 1-2 instead of the compound represented by Chemical Formula 1-1 was dissolved in 3 ml of dimethyl sulfoxide.

[Chemical Formula 1-2]

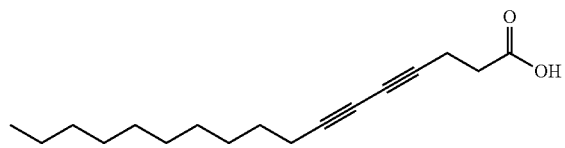

Example 3

Example 3 was performed in the same manner as in Example 1 except that 140 mg of the compound represented by Chemical Formula 1-3 instead of the compound represented by Chemical Formula 1-1 was dissolved in 3 ml of dimethyl sulfoxide.

[Chemical Formula 1-3]

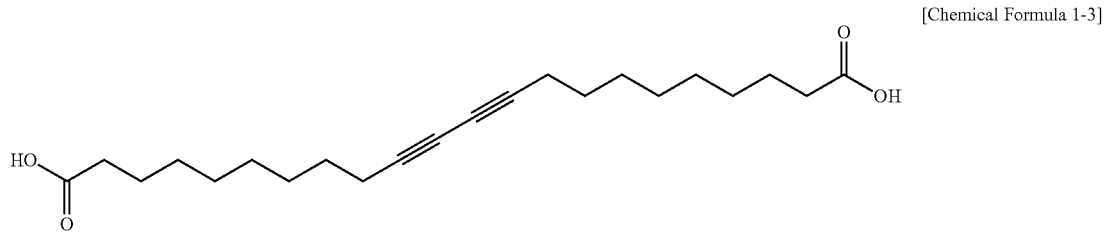 [SMILES: O=C(O)CCCCCCCCC#CC#CCCCCCCCCC(=O)O]

Example 4

Example 4 was performed in the same manner as in Example 1 except that 140 mg of the compound represented by Chemical Formula 1-4 instead of the compound represented by Chemical Formula 1-1 was dissolved in 3 ml of dimethyl sulfoxide.

[Chemical Formula 1-4]

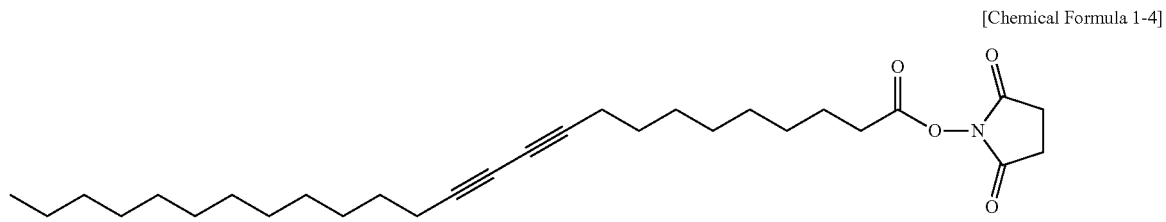 [SMILES: CCCCCCCCCCCCC#CC#CCCCCCCCCC(=O)ON1C(=O)CCC1=O]

Example 5

Example 5 was performed in the same manner as in Example 1 except that 140 mg of the compound represented by Chemical Formula 1-5 instead of the compound represented by Chemical Formula 1-1 was dissolved in 3 ml of dimethyl sulfoxide.

[Chemical Formula 1-5]

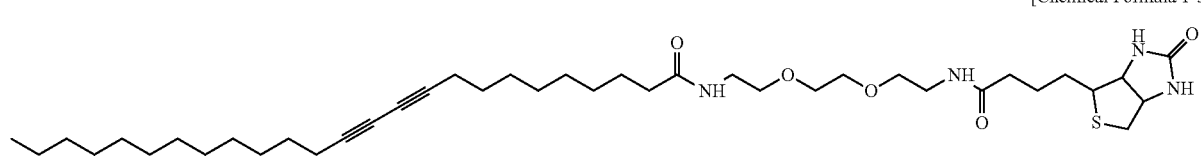

Comparative Example 1

<Preparation of Latex Composition for Dip-Molding>

A 10 L high-pressure polymerization reactor was substituted with nitrogen, the polymerization reactor was equipped with an agitator, a thermometer, a cooler, a nitrogen gas inlet, and an inlet so that a monomer, an emulsifier, and a polymerization initiator were capable of being continuously added, then 100 parts by weight of a monomer mixture including 25 wt % of acrylonitrile, 70 wt % of 1,3-butadiene, and 5 wt % of methacrylic acid, and 2.5 parts by weight of sodium dodecylbenzenesulfonate, 0.5 parts by weight of t-dodecyl mercaptan, and 140 parts by weight of water based on 100 parts by weight of the monomer mixture were added, and the mixture was heated to 40° C. After the temperature of the reactor reached 40° C., 0.25 parts by weight of potassium persulfate as a polymerization initiator was added to perform polymerization. When a polymerization conversion rate reached 95%, 0.1 parts by weight of sodium dimethyldithiocarbamate was added to terminate the polymerization. Subsequently, unreacted monomers were removed through a deodorization process, and ammonia water, an antioxidant and a defoaming agent were added to obtain a carboxylic acid-modified nitrile-based copolymer latex having a solid content concentration of 45 wt % and a pH of 8.5. Here, a glass transition temperature of the prepared carboxylic acid-modified nitrile-based copolymer latex was −30° C., and an average particle size of the carboxylic acid-modified nitrile-based copolymer in the latex was 120 nm.

Subsequently, to 100 parts by weight (based on solid content) of the obtained carboxylic acid-modified nitrile-based copolymer latex, 2 parts by weight of a potassium hydroxide solution having a concentration of 1.25 wt %, 1.2 parts by weight of sulfur powder, 0.7 parts by weight of di-n-butyldithiocarbamate zinc, and secondary distilled water were added to obtain a latex composition for dip-molding having a solid content concentration of 18 wt % and a pH of 10.0.

<Preparation of Dip-Molded Article>

18 parts by weight of calcium nitrate, 81.5 parts by weight of water and 0.5 parts by weight of wetting agent (Teric 320, Huntsman Corporation, Australia) were mixed to prepare a coagulant solution. A hand-shaped ceramic mold was immersed in the prepared coagulant solution for 3 minutes, and then taken out and dried at 80° C. for 4 minutes to coat the coagulant onto the hand-shaped mold.

Thereafter, the mold coated with the coagulant was immersed in the obtained latex composition for dip-molding for 3 minutes, taken out, and dried at 80° C. for 2 minutes.

Then, the dip-molded article was peeled off from the hand-shaped mold to obtain a glove-shaped dip-molded article.

Experimental Example

In order to confirm the color shift phenomenon according to solvent permeation of each of the dip-molded articles prepared in Examples 1 to 5, the dip-molded article of Example 1 was exposed to a tetrahydrofuran (THF) solvent, a toluene solvent and ammonia gas, the dip-molded article of Example 2 was exposed to a methanol solvent, the dip-molded article of Example 3 was exposed to a hexane solvent, the dip-molded article of Example 4 was exposed to hydrochloric acid gas, and the dip-molded article of Example 5 was exposed to sulfuric acid gas, and then the color shift from blue to red was observed in each of the dip-molded articles.

As a result of the observation, it could be confirmed that, as shown in FIGS. 3 to 11, the dip-molded articles exposed to the respective solvents, acids and bases showed the discoloration according to the color shift from blue to red.

Figure 12:
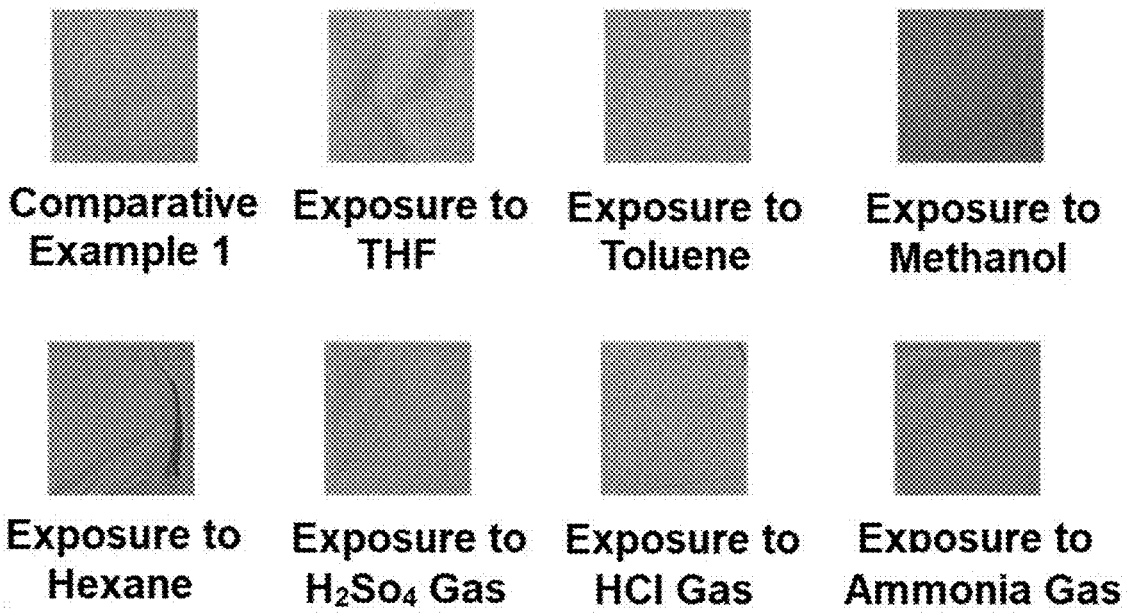
FIG. 12 is an optical image of a dip-molded article in which no color change is generated even when exposed to a tetrahydrofuran (THF) solvent, a toluene solvent, a methanol solvent, a hexane solvent, sulfuric acid gas, hydrochloric acid gas, and ammonia gas, respectively, according to Comparative Example 1.

On the other hand, it could be confirmed that the dip-molded article of Comparative Example 1 exhibited no color change even when exposed to a tetrahydrofuran (THF) solvent, exposed to a toluene solvent, exposed to a methanol solvent, exposed to a hexane solvent, exposed to sulfuric acid gas, exposed to hydrochloric acid gas, and exposed to ammonia gas, as shown in FIG. 12.

The present inventors confirmed from the above-described results that when the dip-molded article is prepared according to the present invention, the dip-molded article includes a separate fluorescent layer capable of allowing the user to visually confirm the presence or absence of defects of the dip-molded article such as internal penetration, or the like, of organic solvents, acids, bases, and the like, by recognizing a change in the use environment according to exposure to the organic solvents, the acids, the bases, and the like, of the dip-molded article, thus securing the use safety of the user.

The invention claimed is:

1. A dip-molded article comprising:
a layer derived from a latex composition for dip-molding; and
a layer derived from a polymer including a repeating unit derived from a diacetylene-based compound,
wherein the diacetylene-based compound is one selected from the group consisting of compounds represented by Chemical Formulas 1-1 to 1-5 below:

[Chemical Formula 1-1]

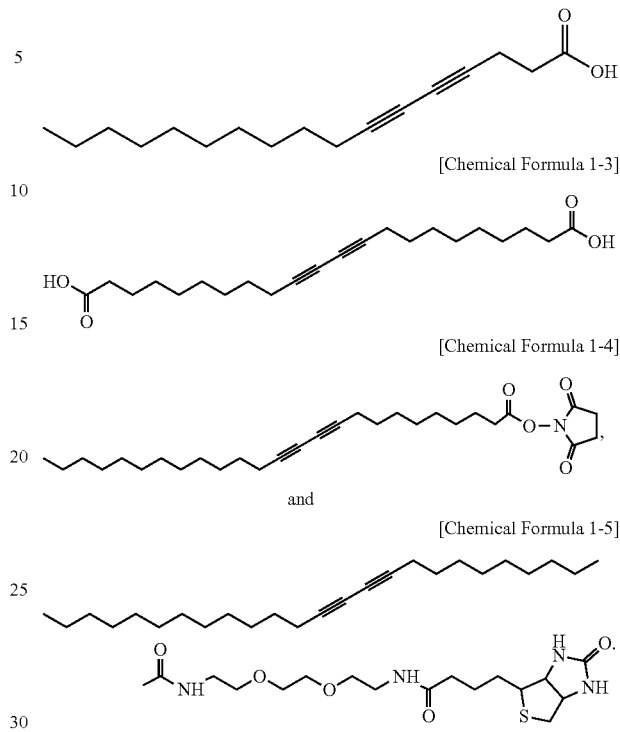

2. The dip-molded article of claim 1, wherein the layer derived from the latex composition for dip-molding is a layer derived from at least one cross-linked copolymer selected from the group consisting of a cross-linked nitrile-based copolymer and a cross-linked carboxylic acid-modified nitrile-based copolymer.

3. The dip-molded article of claim 2, wherein the cross-linked nitrile-based copolymer and the cross-linked carboxylic acid-modified nitrile-based copolymer include
at least one cross-linking agent-derived cross-linking part selected from the group consisting of sulfur and a vulcanization accelerator; and
zinc oxide.

4. A latex composition for dip-molding comprising:
at least one copolymer selected from the group consisting of a nitrile-based copolymer and a carboxylic acid-modified nitrile-based copolymer; and
a diacetylene-based compound,
wherein the diacetylene-based compound is one selected from the group consisting of compounds represented by Chemical Formulas 1-1 to 1-5 below:

[Chemical Formula 1-1]

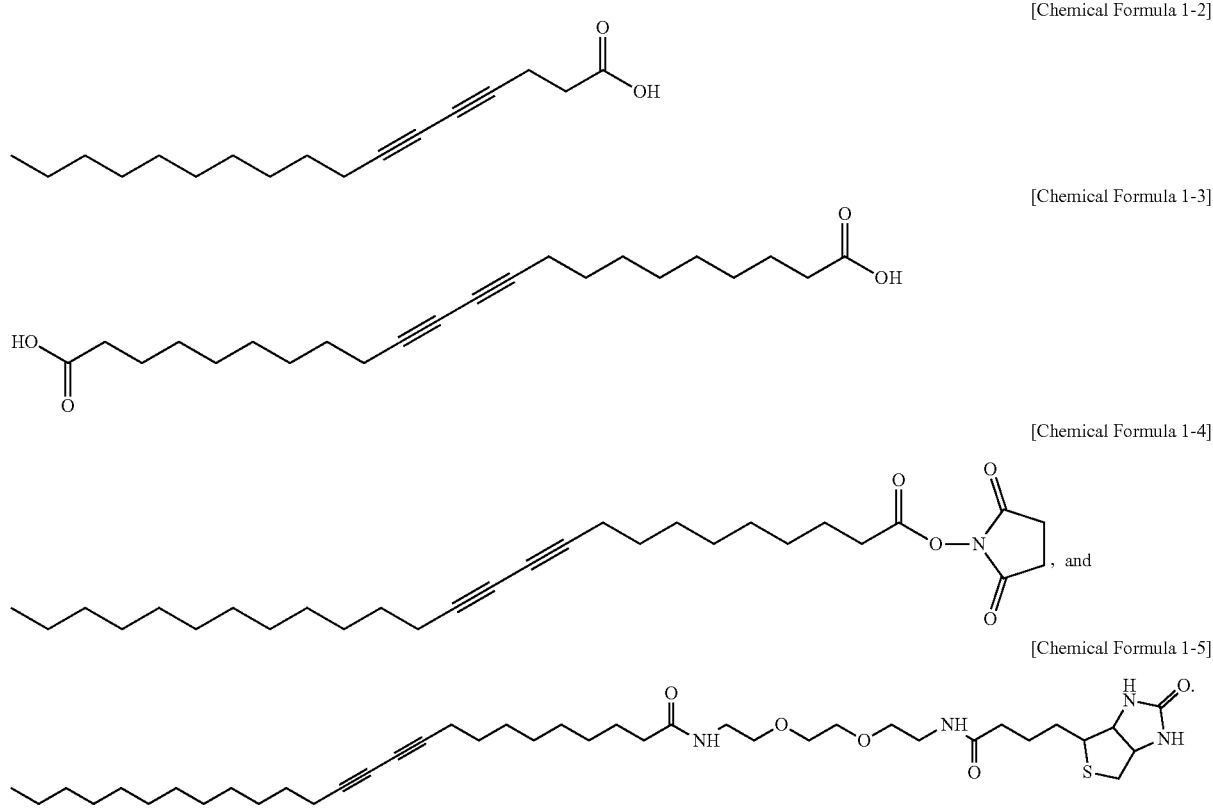

5. A preparation method of a dip-molded article comprising:
attaching a coagulant to a dip-molding frame step S100;
immersing the dip-molding frame having the coagulant attached thereto in a latex composition for dip-molding to form a layer derived from a latex composition for dip-molding step S200; and
forming a layer derived from a polymer including a repeating unit derived from a diacetylene-based compound step S300,
wherein the diacetylene-based compound is one selected from the group consisting of compounds represented by Chemical Formulas 1-1 to 1-5 below:

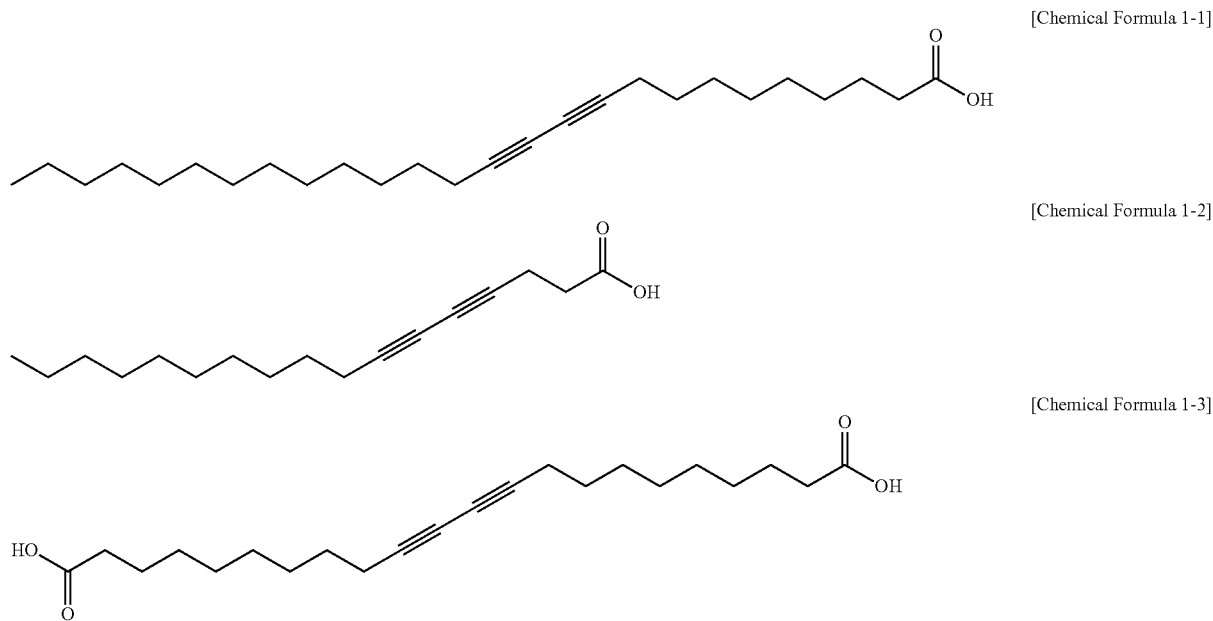

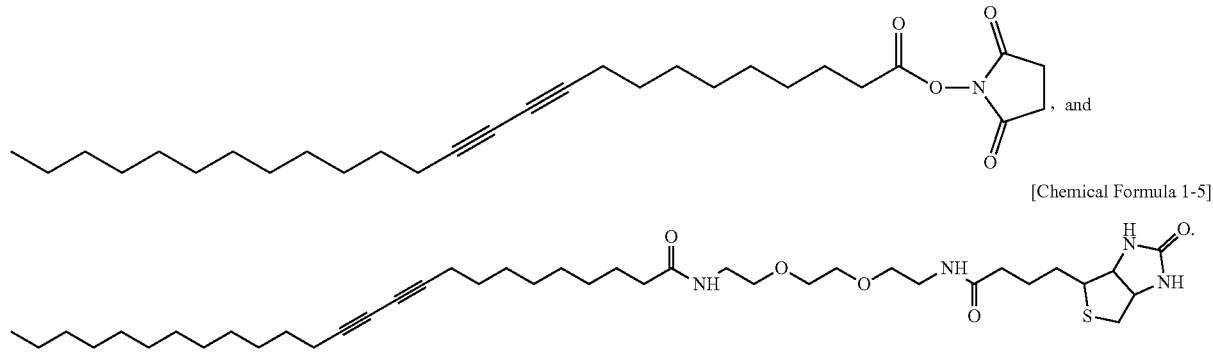

[Chemical Formula 1-4]

[Chemical Formula 1-5]

6. The preparation method of claim 5, wherein the step S200 further includes drying after the immersing.

7. The preparation method of claim 5, wherein the step S300 is performed by immersing the dip-molding frame having the layer derived from the latex composition for dip-molding prepared in the step S200 in a monomer solution including the diacetylene-based compound.

8. The preparation method of claim 7, wherein the monomer solution includes one organic solvent selected from the group consisting of dimethylformamide (DMF), dimethylsulfoxide (DMSO), chloroform, dichloromethane, hexane, tetrahydrofuran (THF), acetone, and alcohol.

9. The preparation method of claim 5, wherein the step S300 further includes drying and UV irradiation.

10. The preparation method of claim 9, wherein the UV irradiation is performed for 5 seconds to 5 minutes in ultraviolet light having a wavelength of 220 nm to 350 nm.

* * * * *